United States Patent
Annan et al.

(10) Patent No.: US 9,420,403 B1
(45) Date of Patent: Aug. 16, 2016

(54) REMOTE DEACTIVATION OF NEAR FIELD COMMUNICATION FUNCTIONALITY

(75) Inventors: Brandon C. Annan, Westwood Hills, KS (US); John E. Belser, Olathe, KS (US); William Michael Parsel, Overland Park, KS (US); Trevor D. Shipley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1181 days.

(21) Appl. No.: 13/363,369

(22) Filed: Jan. 31, 2012

(51) Int. Cl.
*H04B 5/00* (2006.01)
*H04W 4/00* (2009.01)

(52) U.S. Cl.
CPC .................... *H04W 4/008* (2013.01)

(58) Field of Classification Search
CPC .. H04M 2250/04; H04W 4/008; H04W 88/06
USPC ........................................................ 455/41.1
See application file for complete search history.

(56) References Cited

U.S. PATENT DOCUMENTS

| | | | |
|---|---|---|---|
| 6,314,409 B2 | 11/2001 | Schneck et al. | |
| 6,490,601 B1 | 12/2002 | Markus et al. | |
| 6,732,919 B2 | 5/2004 | Macklin et al. | |
| 6,886,741 B1 | 5/2005 | Salveson | |
| 7,043,230 B1 | 5/2006 | Geddes et al. | |
| 7,142,840 B1 | 11/2006 | Geddes et al. | |
| 7,275,105 B2 | 9/2007 | Bloch et al. | |
| 7,376,839 B2 | 5/2008 | Carta et al. | |
| 7,413,113 B1 | 8/2008 | Zhu | |
| 7,494,058 B2 | 2/2009 | Bonalle et al. | |
| 7,546,266 B2 | 6/2009 | Beirne et al. | |
| 7,575,177 B2 | 8/2009 | Killian et al. | |
| 7,637,425 B2 | 12/2009 | Mock et al. | |
| 7,644,859 B1 | 1/2010 | Zhu | |
| 7,853,782 B1 | 12/2010 | Geddes | |
| 7,926,714 B1 | 4/2011 | Zhu | |
| 7,988,060 B2 | 8/2011 | Killian et al. | |
| 7,996,324 B2 | 8/2011 | Bishop et al. | |
| 8,123,128 B1 | 2/2012 | Zhu | |
| 8,249,524 B2* | 8/2012 | Darwhekar | H04B 5/0031 343/853 |
| 8,401,904 B1 | 3/2013 | Simakov et al. | |
| 8,566,168 B1 | 10/2013 | Bierbaum et al. | |
| 8,577,731 B1 | 11/2013 | Cope et al. | |
| 8,594,563 B2* | 11/2013 | Waters et al. | 455/41.1 |
| 8,862,181 B1 | 10/2014 | Cope et al. | |
| 8,909,139 B2* | 12/2014 | Aldana et al. | 455/41.1 |
| 8,983,374 B2* | 3/2015 | Wiley | 455/41.1 |
| 2002/0038258 A1 | 3/2002 | Inoue et al. | |
| 2003/0126094 A1 | 7/2003 | Fisher et al. | |
| 2004/0010462 A1 | 1/2004 | Moon et al. | |
| 2004/0218741 A1 | 11/2004 | Welton | |

(Continued)

OTHER PUBLICATIONS

Office Action dated Oct. 12, 2006; U.S. Appl. No. 10/901,630, filed Jul. 28, 2004.

(Continued)

*Primary Examiner* — Eugene Yun (57) ABSTRACT

A mobile phone comprising a near field communication (NFC) radio transceiver; a near field communication radio antenna; and a coupling component that couples the near field communication radio antenna to the near field communication radio transceiver when selected to a first state and that decouples the near field communication radio antenna from the near field communication radio transceiver when selected to a second state.

20 Claims, 6 Drawing Sheets

(56) References Cited

U.S. PATENT DOCUMENTS

| | | | |
|---|---|---|---|
| 2004/0260647 A1 | 12/2004 | Blinn et al. | |
| 2006/0218635 A1 | 9/2006 | Kramer et al. | |
| 2006/0237528 A1 | 10/2006 | Bishop et al. | |
| 2006/0261949 A1 | 11/2006 | Kim et al. | |
| 2007/0055785 A1 | 3/2007 | Stevens | |
| 2008/0165006 A1 | 7/2008 | Phillips | |
| 2009/0055278 A1 | 2/2009 | Nemani | |
| 2009/0182634 A1 | 7/2009 | Park et al. | |
| 2010/0185545 A1 | 7/2010 | Royyuru et al. | |
| 2011/0165836 A1* | 7/2011 | Dixon et al. | 455/41.1 |
| 2011/0184867 A1 | 7/2011 | Varadarajan | |
| 2011/0237296 A1 | 9/2011 | Coppinger | |
| 2011/0251892 A1 | 10/2011 | Laracey | |
| 2012/0108296 A1 | 5/2012 | Coppinger | |
| 2012/0123935 A1 | 5/2012 | Brudnicki et al. | |
| 2012/0203701 A1 | 8/2012 | Ayuso de Paul | |
| 2013/0159186 A1 | 6/2013 | Brudnicki et al. | |
| 2013/0305333 A1 | 11/2013 | Katzer et al. | |

OTHER PUBLICATIONS

Office Action dated Apr. 5, 2007; U.S. Appl. No. 10/901,630, filed Jul. 28, 2004.

Office Action dated Oct. 9, 2007; U.S. Appl. No. 10/901,630, filed Jul. 28, 2004.

Notice of Allowance dated Apr. 8, 2008; U.S. Appl. No. 10/901,630, filed Jul. 28, 2004.

Office Action dated Apr. 16, 2009; U.S. Appl. No. 12/172,813, filed Jul. 14, 2008.

Notice of Allowance dated Sep. 9, 2009; U.S. Appl. No. 12/172,813, filed Jul. 14, 2008.

Office Action dated Aug. 20, 2010; U.S. Appl. No. 12/631,372, filed Dec. 4, 2009.

Notice of Allowance dated Dec. 14, 2010; U.S. Appl. No. 12/631,372, filed Dec. 4, 2009.

Office Action dated Jul. 7, 2011; U.S. Appl. No. 13/045,306, filed Mar. 10, 2010.

Notice of Allowance dated Oct. 27, 2011; U.S. Appl. No. 13/045,306, filed Mar. 10, 2010.

Office Action dated Mar. 5, 2012; U.S. Appl. No. 13/250,611, filed Sep. 30, 2011.

Final Office Action dated Oct. 5, 2012, U.S. Appl. No. 13/250,611, filed Sep. 30, 2011.

Advisory Action dated Dec. 19, 2012, U.S. Appl. No. 13/250,611, filed Sep. 30, 2011.

Notice of Allowance dated Jun. 21, 2013, U.S. Appl. No. 13/250,611, filed Sep. 30, 2011.

FAIPP Pre-Interview Communication dated Nov. 20, 2012, U.S. Appl. No. 13/344,096, filed Jan. 5, 2012.

FAIPP Office Action dated Jan. 31, 2013, U.S. Appl. No. 13/344,096, filed Jan. 5, 2012.

Notice of Allowance dated Jun. 11, 2013, U.S. Appl. No. 13/344,096, filed Jan. 5, 2012.

Office Action dated Mar. 18, 2010, U.S. Appl. No. 11/866,410, filed Oct. 2, 2007.

Final Office Action dated Aug. 31, 2010, U.S. Appl. No. 11/866,410, filed Oct. 2, 2007.

Restriction Requirement dated May 8, 2014, U.S. Appl. No. 11/866,410, filed Oct. 2, 2007.

Office Action dated Oct. 15, 2014, U.S. Appl. No. 11/866,410, filed Oct. 2, 2007.

FAIPP Pre-Interview Communication dated Mar. 20, 2014, U.S. Appl. No. 13/482,731, filed May 29, 2012.

Notice of Allowance dated May 27, 2014, U.S. Appl. No. 13/482,731, filed May 29, 2012.

Ching, Andrew T., et al., "Payment Card Rewards Programs and Consumer Payment Choice", Journal of Banking & Finance, vol. 34, Issue 8, Aug. 2010, pp. 1773-1787, ISSN 0378-4266, http://dx.doi.org/10.1016/j.jbankfin.2010.03.015.

Zimmerman, Ann, "Check Out the Future of Shopping", The Wall Street Journal, Business, May 18, 2011, http:// online.wsj.com/article/SB10001424052748703421204576329253050634700.html.

Garry, Michael, Kroger Test Prepares for Mobile Future:, SN, Supermarket News, Jun. 13, 2011, http:// supermarketnews.com/technology/kroger-test-prepares-mobile-future.

Jones, Sally, "Industry Trends in POS Hardware for Mobile Devices", Aug. 31, 2011, http://pointofsale. com/20110831734/Mobile-POS-News/industry-trends-in-pos-hardware-for-mobile-devices.html.

Kater, Robin Dale, et al., "Providing Secure Access to Smart Card Applications", U.S. Appl. No. 11/866,410, filed Oct. 2, 2007.

Katzer, Robin Dale, et al., "Secure Online Credit Card Transactions," filed Jan. 25, 2013, U.S. Appl. No. 13/750,831.

FAIPP Pre-Interview Communication dated Mar. 13, 2015, U.S. Appl. No. 13/750,831, filed Jan. 25, 2013.

First Action Interview Office Action dated May 6, 2015, U.S. Appl. No. 13/750,831, filed Jan. 25, 2013.

Final Office Action dated Jun. 23, 2015, U.S. Appl. No. 11/866,410, filed Oct. 2, 2007.

Final Office Action dated Sep. 24, 2015, U.S. Appl. No. 13/750,831, filed Jan. 25, 2013.

Advisory Action dated Dec. 16, 2015, U.S. Appl. No. 13/750,831, filed Jan. 25, 2013.

* cited by examiner

REMOTE DEACTIVATION OF NEAR FIELD COMMUNICATION FUNCTIONALITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Near field communication (NFC) refers to short-range wireless radio communication based on NFC standards. While the term 'short-range' is not precisely defined, the maximum distance for NFC radio communication is about 20 centimeters (about 8 inches) at the time of filing of this patent application. Without limitation, NFC radio communication typically occurs over distances on the order of 4 centimeters (about 1.5 inches). NFC is an open platform technology that is governed by the ECMA-340 standard and the ISO/IEC 18092 standard. NFC standards continue to evolve as the technology and applications of the technology are elaborated and refined.

NFC radio communication may be used for financial transactions such as completing a payment transaction from a mobile phone encapsulating an electronic credit card and/or debit card to a point-of-sale (POS) terminal. NFC radio communication may be used to provide personal identification and/or to electronically access physical spaces, for example to provide a student identification, an employee identification, a medical identification; to activate a badge reader to unlock an entry door; to access a hotel room; to access a rental car. NFC radio communication may be used for communicating content such as reading explanatory information from an NFC tag coupled to a placard in a museum or in a retail display. NFC radio communication may be used for downloading an audio or video presentation, for example an audio tour of a museum or other exhibition.

SUMMARY

In an embodiment, a mobile phone is disclosed. The mobile phone comprises a near field communication (NFC) radio transceiver, a near field communication radio antenna, and a coupling component. The coupling component couples the near field communication radio antenna to the near field communication radio transceiver when selected to a first state and that decouples the near field communication radio antenna from the near field communication radio transceiver when selected to a second state.

In an embodiment, a method of operating a near field communication radio system in a mobile phone is disclosed. The method comprises receiving a disable message via a cellular radio transceiver on a mobile phone, wherein the disable message requests disabling a near field communication radio system of the mobile phone and, in response to the disable message, disabling an antenna functionality of the near field communication radio system of the mobile phone. The method further comprises receiving an enable message via the cellular radio transceiver, wherein the enable message requests enabling the near field communication radio system and, in response to the enable message, enabling the antenna functionality of the near field communication radio system.

In an embodiment, a portable electronic device is disclosed. The portable electronic device comprises a cellular communication radio transceiver, a near field communication (NFC) radio transceiver, a near field communication radio antenna, a processor, a memory, and an application stored in the memory. When executed by the processor, based on the cellular communication radio transceiver receiving a near field communication radio disable criterion message, the application selectively disables the near field communication radio antenna and enables the near field communication radio antenna based on a criterion provided in the near field communication disable criterion message, wherein when the near field communication radio antenna is disabled, the near field communication radio transceiver is not able to transmit or receive near field communication messages.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Near field communication (NFC) radio systems are being included in more and more electronic devices such as mobile phones, personal digital assistants (PDAs), media players, and other electronic devices, and this trend is expected to continue as the public becomes familiar with and embraces the convenience provided by NFC functionality. NFC radio systems may be coupled with one or more secure element (SE) in an electronic device that together provide a relatively independent, stand-alone functionality. For example, an NFC radio system and associated secure element may be capable of completing a payment transaction with a point-of-sale (POS) terminal even when the electronic device is powered off, even when the electronic device has had its battery removed. The relative isolation of the NFC radio system and the secure element promote security and discourage electronic crime attempts that might attempt to steal funds from the secure element.

The question arises, how are the NFC radio system and/or secure element deactivated when the electronic device is retired from service or exchanged for a new electronic device by the original user? How are the NFC radio system and/or secure element deactivated when the electronic device is migrated from an original owner to a second owner? For security reasons, direct access by device applications or by a telecommunication service provider to the NFC radio system and/or secure element is discouraged, limited, or prohibited by financial institutions that are concerned that allowing direct access may create a theft or fraud vulnerability. The present disclosure teaches remote deactivation and activation of the NFC radio system by disabling and enabling of an NFC radio antenna. This approach allows deactivation and reactivation of the NFC communication capability without exposing the confidential information stored in the secure element and without providing a different access path. Additionally, this approach may involve little or no involvement on the part of the financial institution and may be said to be transparent to the financial institution and/or to existing systems.

For example, an NFC radio system deactivate message can be transmitted to the electronic device from a cellular wireless tower, for example from a base transceiver station (BTS). The electronic device can respond to the deactivate message by reconfiguring the NFC radio antenna and/or an impedance matching network that couples the NFC radio antenna to the NFC radio transceiver so as to defeat the normal function of the NFC radio antenna and thereby deactivate the NFC radio system. Likewise, an NFC radio system activate message can be transmitted to the electronic device from the BTS, and the electronic device can respond to the activate message by reconfiguring the NFC radio antenna and/or impedance matching network so as to restore normal function of the NFC radio antenna and thereby activate the NFC radio system.

It is contemplated that the normal functionality of the NFC radio antenna can be defeated and restored in a number of different manners. A flip-flop electronic switch may be placed in-line with one or more lines coupling the NFC radio antenna to the NFC radio transceiver. When it is desired to defeat the NFC radio antenna, the flip-flop electronic switch may be commanded to open, thereby decoupling the NFC radio antenna from the NFC radio transceiver. In this disabled state, near field communication radio frequency signals may interact with the NFC radio antenna, but these signals cannot propagate across the open circuit to the NFC radio transceiver. Likewise, the NFC radio transceiver may output a near field communication radio frequency signal, but this signal cannot be emitted because there is no path for the signal to propagate across the open circuit to the NFC radio antenna and thence to be radiated by the antenna. Alternatively, the flip-flop switch may be placed such as to short the leads of the NFC radio antenna together when the flip-flop switch is closed, thereby disabling the antenna.

It is known to those skilled in the art that it is typically desired to provide an impedance matching network or impedance matching component between an antenna and a radio transceiver in order to promote effective transmission and reception of radio signals. When the antenna and radio transceiver are not coupled together by a properly tuned impedance matching component, the propagation of radio signals are severely attenuated, to the extent that radio communication may be prevented. In an embodiment, an impedance matching component that couples the NFC radio antenna to the NFC radio transceiver in the electronic device is selectable to a tuned state and to a detuned state, for example by switching electrical components such as resistors, inductors, and/or capacitors into or out of the circuit in one of parallel or series configurations. It is known to those skilled in the art that inductors and capacitors may take a variety of forms in radio frequency circuits, including different lengths of stripline stubs or microstrip stubs or other structures. In the detuned state of the impedance matching component, the NFC radio antenna and the NFC radio transceiver are effectively decoupled; in the tuned state of the impedance matching component, the NFC radio antenna and the NFC radio transceiver are coupled.

An application may execute on the electronic device that controls the deactivation and activation of the NFC radio system. The application may respond to requests received via wireless communication by the electronic device. A subscriber to wireless cellular communication services who has misplaced their electronic device that has an NFC radio system and secure element encapsulating a credit card or debit card may contact a customer care center operated by the wireless communication service provider, anxious to prevent fraudulent use of their NFC radio system to complete payment transactions. The customer care center may send an NFC radio system deactivation request to the electronic device, and the application may in response deactivate the NFC radio system in one of the manners described above, thereby thwarting any attempts to use the NFC radio system to complete a payment transaction. Later the subscriber may find their misplaced electronic device and call the customer care center to have their NFC radio system be activated. The customer care center may send an NFC radio system activation request to the electronic device, and the application may in response activate the NFC radio system. This scenario exhibits the convenience of deactivating and/or activating the NFC radio system.

By contrast, if the subscriber instead contacted their financial institution to disable the debit card, they may be told this is not possible, that the debit card is essentially the same as cash money. If the subscriber contracted their financial institution to cancel their credit card, they may find that when they find their misplaced electronic device there may be a delay of several days before they can stand up a new replacement credit card on their electronic device. Further, if they have established automatic payment of bills based on the now canceled credit card, they will have to contact each of the several business enterprises to transfer automated bill payment from the now canceled credit card to the new credit card.

In an embodiment, the application may be capable of conditional deactivation and/or activation of the NFC radio system, for example where the conditioned deactivation/activation is determined by a criterion provided via a message received wirelessly from the base transceiver station. The criterion may indicate that the NFC radio system is to be activated only for a specific duration of time, for example for the subsequent two hours. A parent may be notified by a child stuck by unexpected winter weather in an airport that their flight has been canceled and that the child needs to pay for a hotel room with a credit card that is installed in the secure element of their electronic device. Normally the parent may not trust their child to responsibly limit credit card purchases and hence have the NFC radio system on their child's electronic device deactivated. Under this special circumstance, the parent can maintain their control of the child's access to the credit card generally but suspend this control for a limited time duration to allow the child to obtain the needed hotel room. The criterion may indicate that the NFC radio system is to be activated at specific times of day, for example during regular school hours on school days, thereby enabling a student identification function via the NFC radio system and possibly a student lunch debit card function via the NFC radio system.

In an embodiment, the application may be able to selectively distinguish between operational modes of the NFC radio system and selectively deactivate/activate the NFC radio system based on the current operational mode. For example, the application may be able to determine that the NFC radio system is engaged in reading content from a near field communication tag and may activate the NFC radio system, for example by enabling the NFC radio antenna. When the application determines that the NFC radio system is attempting to complete a payment transaction, the application may deactivate the NFC radio system, for example by disabling the NFC radio antenna.

Figure 1:
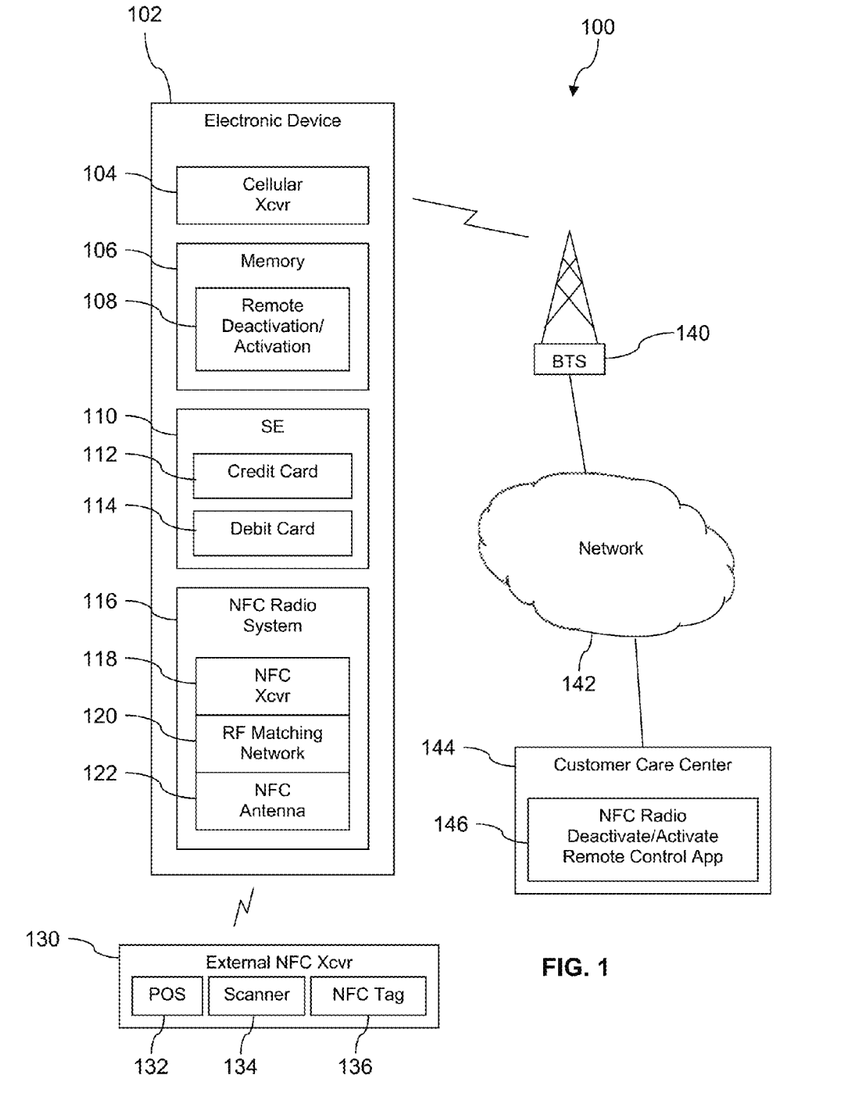
FIG. 1 is an illustration of a communication system according to an embodiment of the disclosure.

Turning now to FIG. 1, a communication system 100 is described. The system 100 comprises an electronic device 102 such as a mobile phone, a personal digital assistant (PDA), a media player, or other portable electronic device. In an embodiment, the electronic device 102 comprises a cellular radio transceiver 104, a memory storing a near field communication radio system remote deactivation/activation application 108, a secure element (SE) 110 that encapsulates a credit card 112 and/or a debit card 114, and a near field radio system 116. The secure element 110 may store other confidential information such as access codes or identity codes. The NFC radio system 116 may comprise a near field communication radio transceiver 118, a radio frequency matching network 120, and a near field communication radio antenna 122. In some contexts, the RF matching network 120 may be referred to as an impedance matching network and/or as a coupling component.

The cellular radio transceiver 104 may receive a wireless communication link from a cell tower such as a base transceiver station (BTS) 140. The cellular radio transceiver 104 and the base transceiver station 140 may wirelessly communicate based on one of a code division multiple access (CDMA) wireless communication protocol, a global system for mobile communications (GSM) wireless communication protocol, a long-term evolution (LTE) wireless communication protocol, or a worldwide interoperability for microwave access (WiMAX) wireless communication protocol. The base transceiver station 140 provides the electronic device 102 with communications connectivity to the network 142 which may be any combination of public and private communication networks. A variety of other devices (not shown) may connect to the network 142 and communicate via the network 142 to the electronic device 102. For example, a customer care representative in a call center may communicate with the electronic device 102 using a voice communication link and/or a data communication link established at least in part by the network 142 and the base transceiver station 140.

The NFC radio system 116 may communicate with an external near field communication radio transceiver 130 to conduct a variety of NFC activities. The external NFC radio transceiver 130 may be incorporated in any of a point-of-sale terminal 132, an electronic scanner 134, or a near field communication tag 136. The NFC radio system 116 may communicate with the external NFC radio transceiver 130 incorporated in the point-of-sale terminal 132 to complete a payment transaction, for example by debiting a purchase amount to the debit card 114 encapsulated in the secure element 110. The NFC radio system 116 may communicate with the external NFC radio transceiver 130 incorporated in the electronic scanner 134 to provide electronic credentials such as an employee badge number, a student identity number, a hotel room access key, a rental car access code, or other confidential access information. The electronic scanner 134 may provide appropriate access based on receiving the subject confidential access information from the NFC radio system 116. The NFC radio system 116 may communicate with the external NFC radio transceiver 130 incorporated in the NFC tag 136 to retrieve content such as further information associated with a poster or to download an audio tour content at an admission desk of an art museum. In an embodiment, the NFC radio system 116 may communicate with the external NFC radio transceiver 130 over distances that are less than 20 inches. In an embodiment, the NFC radio system 116 may communicate with the external NFC radio transceiver 130 over distances that are less than 8 inches.

In an embodiment, the NFC radio system 118 is configured to engage in NFC communications even when the electronic device 102 is lacking battery power. In some modes of NFC communication operation, the external NFC radio transceiver 130 may provide power to the NFC radio system 118 via an electromagnetic power field emitted by the external NFC radio transceiver 130. The secure element 110 is designed to resist tampering and to be relatively isolated from the other functionality of the electronic device 102. A question arises as to how to dispose of the electronic device 102 when the user transitions to a new electronic device 102, for example when the user upgrades to a later generation mobile phone? The secure element 110 remains on the electronic device 102. The NFC radio system 118 remains on the electronic device 102 and at least theoretically provides a viable route for accessing the secure element 110, for example to fraudulently charge purchases to the credit card 112.

Another question arises as to what to do if the electronic device 102 is lost. The user can call the credit card company and cancel the credit card account associated with the credit card 112 stored in the secure element 110. If the electronic device 102 is subsequently recovered—for example a restaurant contacts the user to notify him or her that the electronic device 102 was left at their location or the user discovers the electronic device 102 on a shelf in the garage—this cancelation of the credit card may involve inconvenience to the user. The credit card issuer may take some days to reissue a new card and install it to the secure element 110 of the electronic device 102. Additionally, if the user has used the credit cart 112 to support on-line bill payment, the user may have to call each of the merchants and/or utilities and transfer the on-line bill payment function to the new card. On the other hand, if the electronic device 102 is in fact lost, the user will regret not having canceled the credit card 112 and debit card 114 if their accounts are then plundered by an identity thief.

The present disclosure teaches a system and method for remotely deactivating and activating the NFC radio system 116. Thus, if the user misplaces their electronic device 102, he or she can call a customer care center 144 of the wireless communication service provider and request that the NFC radio system 116 be deactivated. The customer care center 144 can send a near field communication system deactivate message wirelessly to the electronic device 102, and the electronic device 102 can deactivate the NFC radio system 116 in response to the deactivate message. In the deactivated mode of operation, the NFC radio system 116 cannot be used for NFC communications, thereby thwarting any fraudulent attempts to conduct payment transactions, accesses to secured physical areas, or downloading of content via the NFC radio system 116. Later, if the electronic device 102 is relocated, the user can call the customer care center 144 and request that the NFC radio system 116 be activated. The customer care center 144 can send a near field communication system activate message wirelessly to the electronic device 102, and the electronic device 102 can activate the NFC radio system 116 in response to the activate message.

In an embodiment, the NFC radio system 116 is deactivated by disabling the NFC radio antenna 122 and/or by disabling the RF matching network 120. Basically, when NFC radio signals cannot be received via the NFC radio antenna 122 and/or via the RF matching network 120 by the NFC transceiver 118 and when the radio signals emitted by the NFC transceiver 118 cannot be transmitted by the RF matching network 120 and/or by the NFC radio antenna 122, the NFC radio system 116 is effectively deactivated. The present disclosure contemplates a variety of different ways to disable and enable the NFC radio antenna 122 and/or disable and enable the RF matching network 120. In an embodiment, two or more different ways to disable and/or enable the NFC radio antenna 122 and/or disable and/or enable the NFC radio transceiver 118 may be used in combination. The RF matching network 120 and/or the NFC radio antenna 122 may be selectively disabled and enabled by the application 108. In an embodiment, when selected to be disabled, the RF matching network 120 and/or the NFC radio antenna 122 remains disabled until selected to be enabled. In an embodiment, when selected to be enabled, the RF matching network 120 and/or the NFC radio antenna 122 remains enabled.

In an embodiment, a switch may be placed between the NFC radio antenna 122 and the NFC radio transceiver 118 so that when the NFC radio system 116 is selected to an activated state, the switch is closed and when the NFC radio system 116 is selected to a deactivated state, the switch is open. In an embodiment, the switch remains in the state it is in until it is selected to change state. The switch may be located between the NFC radio antenna 122 and the RF matching network 120 or between the RF matching network 120 and the NFC radio transceiver 118. The switch may be a solid-state device that can be selected to open or closed and then maintain the selected state whether the electronic device 102 is powered or not powered. In an embodiment, the switch may be a flip-flop type of switch. In alternative embodiment, the switch may be placed across the leads of the NFC radio antenna 122 so that when the NFC radio system 116 is selected to the activated state, the switch is open and when the NFC radio system 116 is selected to the deactivated state, the switch is closed, thereby shorting the leads of the NFC radio antenna 122. Alternatively, the switch may be placed across the leads of the RF matching network 120 where it couples to the NFC radio transceiver 118 so that when the NFC radio system 116 is selected to the activated state, the switch is open and when the NFC radio system 116 is selected to the deactivated state, the switch is closed, thereby shorting the leads of the RF matching network 120.

In an embodiment, the NFC radio system 116 may be disabled by detuning the RF matching network 120 and enabled by restoring tuning of the RF matching network 120. The RF matching network 120 may be detuned by switching any of one or more capacitive elements and/or one or more inductive elements into the RF matching network 120. In some contexts, tuning the RF matching network 120 may be referred to as configuring the RF matching network 120 to match the NFC radio antenna 122 to the NFC radio transceiver 118 and detuning the RF matching network 120 may be referred to as configuring the RF matching network 120 to unmatch the NFC radio antenna 122 to the NFC radio transceiver 118. As is known to one skilled in the art, at radio frequencies capacitive elements and inductive elements may comprise lengths of microstrip stubs and/or lengths of stripline stubs. The switching of capacitive and/or inductive elements into the RF matching network 120 may be performed by the flip-flop switch described above. The detuning of the RF matching network 120 may alternatively be analyzed and conceptualized as inserting a notch filter into the radio frequency pathway between the RF radio antenna 122 and the NFC radio transceiver 118, where the notch filter excludes the frequencies associated with NFC radio.

In an embodiment, the NFC radio system 116 may be disabled by emitting a jamming signal by a second NFC radio system (not shown) of the electronic device 102. The jamming signal could be used to thwart NFC radio transmission and reception by the NFC radio system 116. The jamming signal may be selectively turned on or off by the application 108. In an embodiment, a noise signal may be emitted to interfere with NFC radio transmission and reception by the NFC radio system 116. Alternatively, in an embodiment, a signal cancelation component (not shown) may be placed in the NFC radio system 116 that detects a transmission signal of the NFC radio transceiver 118, generates a duplicate signal 180 degrees out-of-phase with the transmission signal of the NFC radio transceiver 118, and injects this out-of-phase signal into the RF matching network 120 or elsewhere in the NFC radio system 116 to nullify the transmission signal of the NFC radio transceiver 118. The same signal cancelation component may detect a received NFC radio signal, generate a duplicate signal 180 degrees out-of-phase with the received signal, and inject this out-of-phase signal into the RF matching network 120 or elsewhere in the NFC radio system 116 to nullify the reception signal. The signal cancelation component may be selectively turned on or off by the application 108.

In an embodiment, the NFC radio antenna 122 and the NFC radio transceiver 118 may be coupled together by a radio frequency circulator (not shown). In an embodiment, the circulator may feature a selectable switch in-line with one of an input port or an output port. When the selectable switch is closed, both radio transmission and radio reception is enabled for the NFC radio system 116. When the selectable switch is selected open, only one of radio transmission and radio reception is enabled. For example, in an embodiment, the circulator may include an in-line switch in the output port. When the in-line switch is selected open, the NFC radio system 116 is disabled from transmitting NFC radio signals—for example disabled from completing payment transactions and/or from providing confidential information in support of access authentication—but is enabled for receiving NFC radio signals—for example enabled to upload content such as information from a poster or an audio tour. The selectable switch in-line with one of the ports of the circulator may be selectively controlled open or closed by the application 108.

It is contemplated that the application 108 may enable and disable the NFC radio system 116 according to a variety of different control regimes. In an embodiment, the application 108 may act simply as an agent of a remote NFC radio deactivation/activation control functionality that is provided by a wireless service provider. For example, the application 108 may respond to near field communication radio deactivate messages and near field communication radio activate messages generated by a near field communication radio deactivate/activate remote control application 146 executing on a computer system in the customer care center 144 and sent by the customer care center 144 to the application 108 via the network 142 and the base transceiver station 140. Computer systems are described further hereinafter. The wireless service provider may also provide access to invoke the functions of the remote control application 146 directly by the user or subscriber to activate and/or deactivate the NFC radio system 116, for example via a web interface that authenticates the subscriber before permitting the sensitive activate/deactivate functions to be invoked.

When the application 108 receives an NFC deactivate message, the application 108 deactivates the NFC radio system 116 using any of the approaches described above. When the application receives an NFC activate message from the remote control application 146, the application activates the NFC radio system 116 using any of the approaches described above. For example, the user may call the customer care center 144 and request that the NFC radio system 116 of the electronic device 102 be deactivated as a precaution against someone finding the electronic device 102 and attempting to make purchases using the credit card 112 or debit card 114 in the secure element 110 based on operating the NFC radio system 116. The customer care representative may command the remote control application 146 to send a near field communication deactivate message to the electronic device 102, and the application 108 may deactivate the NFC radio system 116 using any of the approaches described above. When the user finds their misplaced electronic device 102, they can call customer care, the customer care representative may command the remote control application 146 to send a near field communication activate message to the electronic device 102, and the application 108 may activate the NFC radio system 116 using any of the approaches described above.

As another example, the NFC radio system 116 may normally be deactivated, for example when the electronic device 102 belongs to a child, and the parent of the child wishes the NFC radio system 116 to be deactivated to prevent credit card transactions. In a special circumstance, for example the child is stuck at an airport due to unexpected weather conditions and must rent a hotel room, the parent may call the customer care center to request activation of the NFC radio system 116, the customer care representative may command the remote control application 146 to send a near field communication activate message to the electronic device 102, and the application 108 may activate the NFC radio system 116 using any of the approaches described above. After the child checks out of the hotel and/or returns home, the parent can call the customer care center 144, a customer care agent can invoke the remote control application 146 to send a near field communication deactivate message to the electronic device 102, and the application 108 may deactivate the NFC radio system 116 using any of the approaches described above.

In an embodiment, the application 108 may receive deactivate and/or activate messages that include a criterion or a plurality of criteria. For example, the application 108 may receive a deactivate message from the remote control application 146 that comprises a time-of-day criterion. The time-of-day criterion may indicate that the NFC radio system 116 should be activated during school days during school hours but deactivated outside these hours. This time-of-day criterion may enable a child to use the electronic device 102 to access a school building with a student identity, to checkout library books with the student identity, and to pay for lunch with a school lunch debit card all based on near field communication radio operations using the NFC radio system 116. This time-of-day criterion may also prevent the child from ordering musical content from an on-line store outside of school hours or charging items on a credit card stored in the secure element 112 of the electronic device 102 outside of school hours.

The criterion may specify that the application 108 is to activate the NFC radio system 116 for a specified time duration and then deactivate the NFC radio system 116 after the expiration of this time duration. The criterion may specify that the application 108 is to deactivate the NFC radio system 116 for a specified time duration and then activate the NFC radio system 116 after the expiration of this time duration. The criterion may specify that the application 108 is to enable the NFC radio system 116 for receiving NFC radio communications, for example to upload content from a poster and/or to upload an audio tour, but to disable the NFC radio system 116 for transmitting NFC radio communications, for example by controlling a switch coupled to an output port of a radio frequency circulator component coupled to the NFC radio antenna 122. The criterion may specify yet further conditions for enabling/disabling NFC radio communications of the NFC radio system 116.

The application 108 may be able to determine the kind of NFC radio session that is in-progress by the kinds of messages and/or the timing of messages that are exchanged between the NFC radio system 116 and the external NFC radio transceiver 130 and may selectively enable/disable the NFC radio system 116 to enable and/or disable specific types of NFC radio sessions that are identified in the criterion. For example, a near field communication reception operation mode may be detected based on determining that the NFC radio system 116 is generating a radio power signal and/or an electromagnetic power field to enable a passive NFC radio to transmit to the NFC radio system 116. A disable criterion message may identify NFC radio operation modes that are to be disabled by the application 108. The disable criterion message may identify that NFC radio transaction modes are to be disabled while enabling other NFC radio operation modes. The disable criterion message may identify that NFC radio access operations—for example transmitting confidential information to access secured areas, to identify an individual, to access a rental car, and other access—are to be disabled while enabling other NFC radio operation modes. The disable criterion message may identify that both NFC radio transaction mode and NFC radio access mode are to be disabled.

Figure 2:
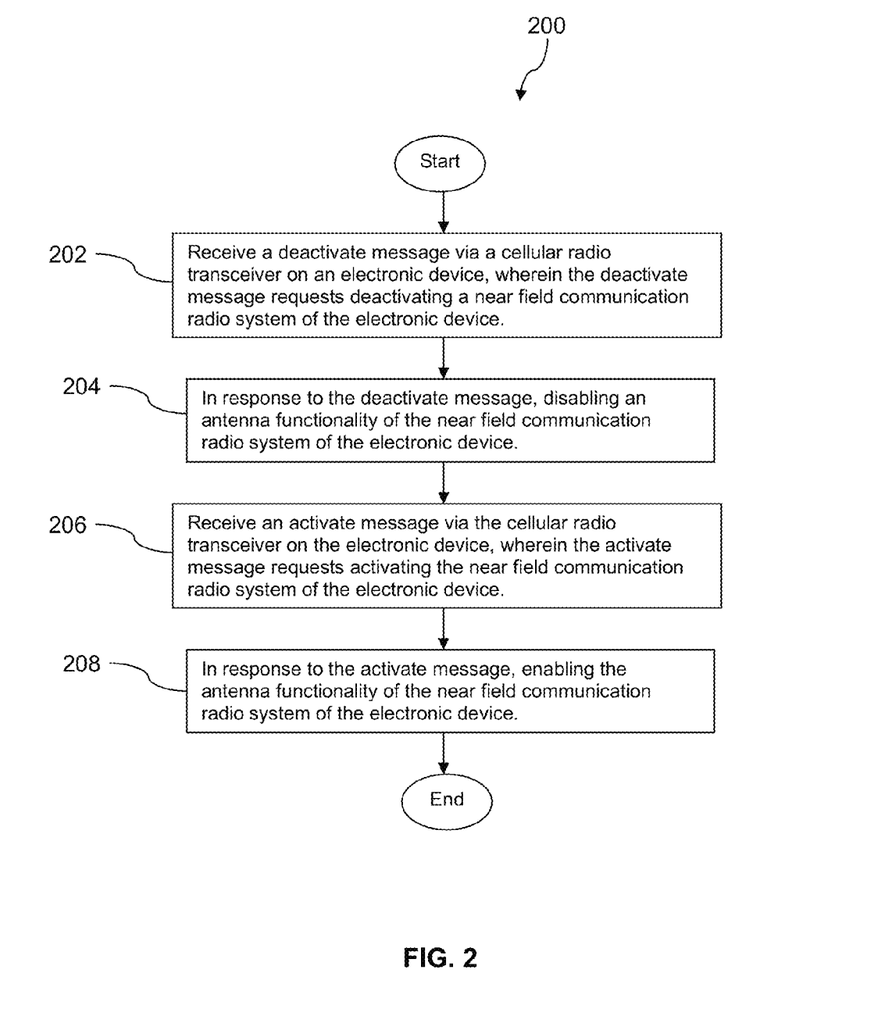
FIG. 2 is a flow chart of a method according to an embodiment of the disclosure.

Turning now to FIG. 2, a method 200 is described. At block 202, a deactivate message is received via a cellular radio transceiver on an electronic device, wherein the deactivate message requests deactivating a near field communication radio system of the electronic device. For example, the remote control application 146 sends a deactivate message to the network 142, the network transmits the deactivate message to the base transceiver station 140, and the base transceiver station 140 wirelessly transmits the deactivate message to the cellular radio transceiver 104. The application 108 receives the deactivate message from the cellular radio transceiver 104 or other intermediate application executing on the electronic device 102. At block 204, in response to the deactivate message, the antenna functionality of the near field communication radio system of the electronic device is disabled. For example, the remote control application 108 disables the NFC radio system 116 according to one of the approaches described above with reference to FIG. 1.

At block 206, an activate message is received via a cellular radio transceiver on an electronic device, wherein the activate message requests activating a near field communication radio system of the electronic device. For example, the remote control application 146 sends an activate message to the network 142, the network transmits the activate message to the base transceiver station 140, and the base transceiver station 140 wirelessly transmits the activate message to the cellular radio transceiver 104. The application 108 receives the activate message from the cellular radio transceiver 104 or other intermediate application executing on the electronic device 102. At block 208, At block 204, in response to the activate message, the antenna functionality of the near field communication radio system of the electronic device is enabled. For example, the remote control application 108 enables the NFC radio system 116 according to one of the approaches described above with reference to FIG. 1. It is understood that the order of the processing of the blocks 202, 204, 206, 208 may be performed in a different order. The order described above implies that the initial condition of the NFC radio system 116 is activated. In the case the initial condition of the NFC radio system 116 is deactivated, the processing of blocks 206 and 208 may be performed and optionally later the processing of blocks 202 and 204 may be performed.

Figure 3:
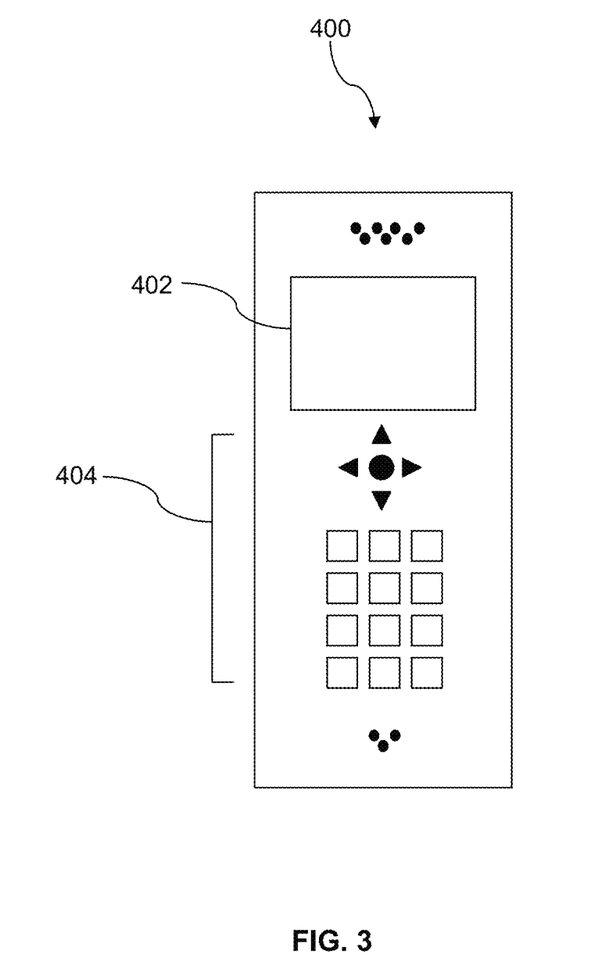
FIG. 3 is an illustration of an electronic device according to an embodiment of the disclosure.

FIG. 3 depicts a mobile device 400, which is operable for implementing aspects of the present disclosure, but the present disclosure should not be limited to these implementations. For example, in some embodiments the electronic device 102 described above with reference to FIG. 1 may be implemented as the mobile device 400. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 4:
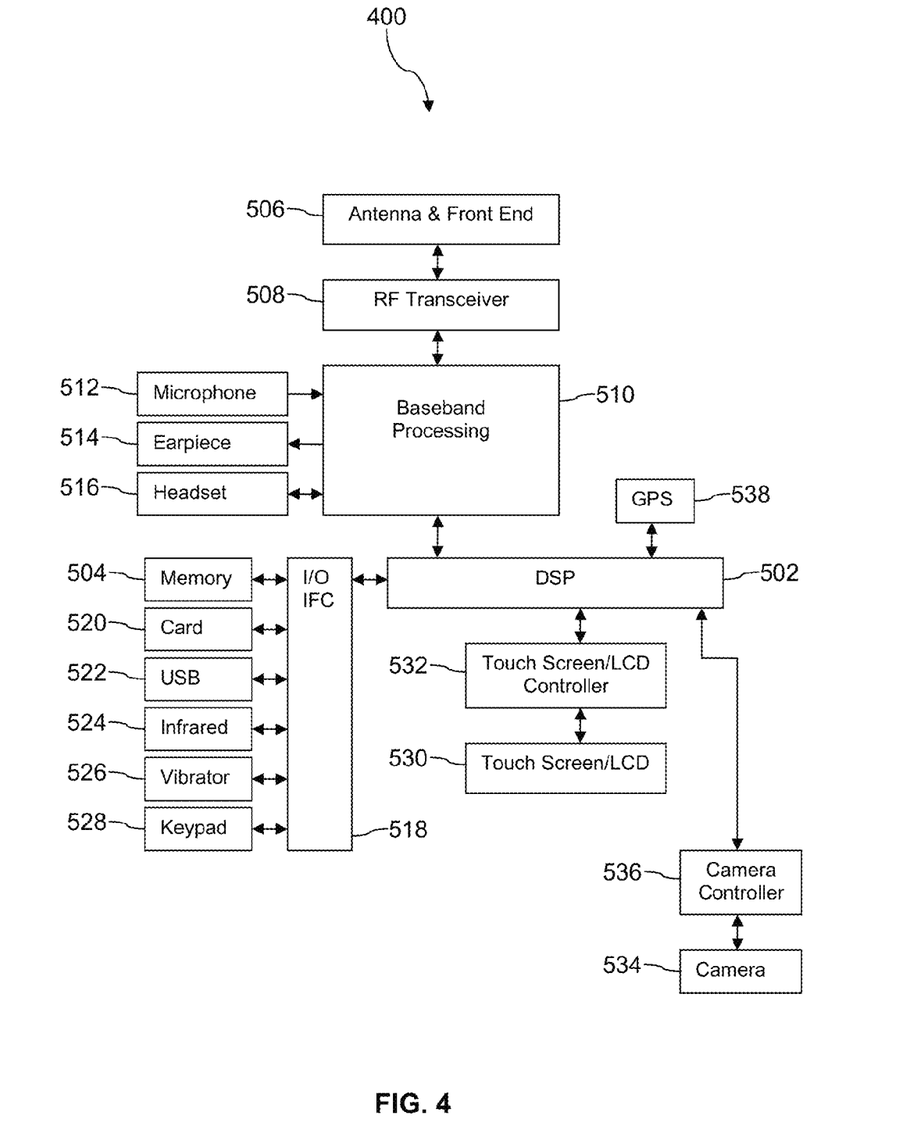
FIG. 4 is a block diagram of an electronic device according to an embodiment of the disclosure.

FIG. 4 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 5A:
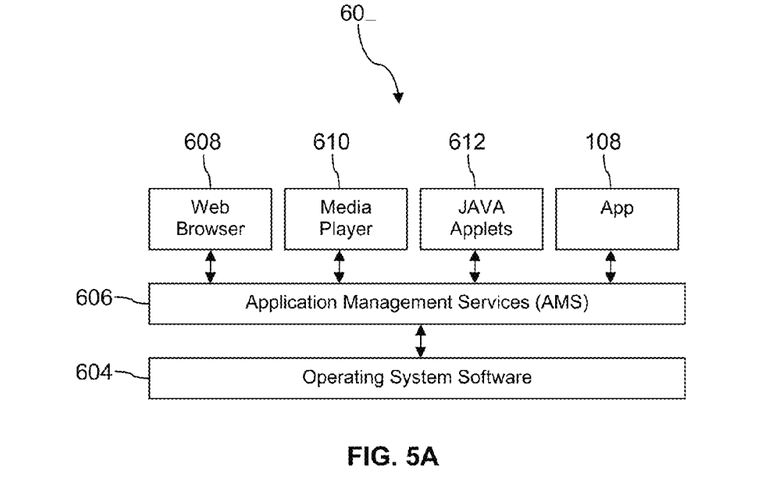
FIG. 5A is an illustration of a software architecture of an electronic device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612, and the remote activation/deactivation application 108 described above with reference to FIG. 1. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 5B:
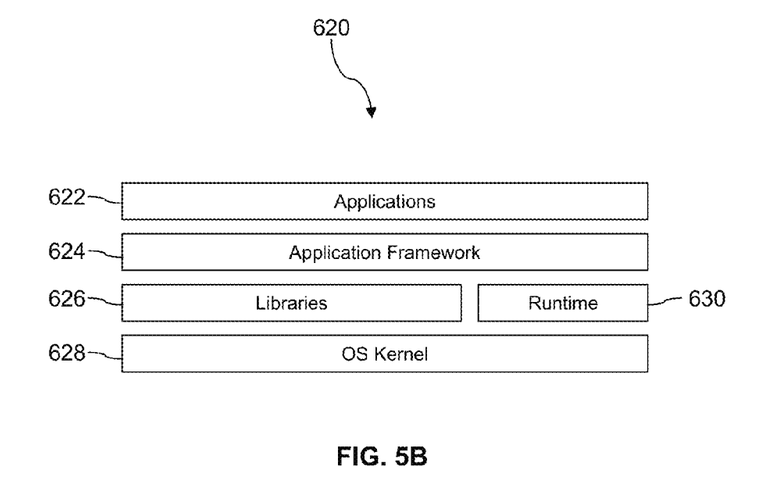
FIG. 5B is an illustration of another software architecture of an electronic device according to an embodiment of the disclosure.

FIG. 5B illustrates an alternative software environment 620 that may be implemented by the DSP 502. The DSP 502 executes operating system software 628 and an execution runtime 630. The DSP 502 executes applications 622 and the remote activation/deactivation application 108 that may execute in the execution runtime 630 and may rely upon services provided by the application framework 624. Applications 622, the remote activation/deactivation application 108, and the application framework 624 may rely upon functionality provided via the libraries 626.

Figure 6:
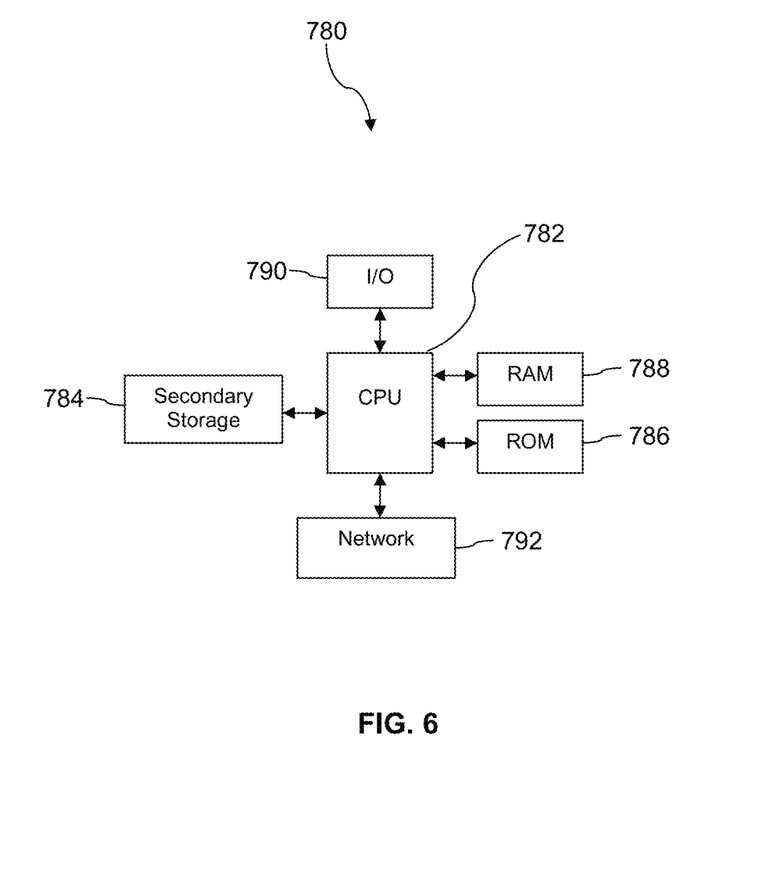
FIG. 6 is a block diagram of a computer system according to an embodiment of the disclosure.

FIG. 6 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. The network connectivity device 792 may comprise a WiFi, a Bluetooth®, and/or a ZigBee® radio transceiver card. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile phone, comprising:
   a near field communication (NFC) radio transceiver included in the mobile phone;
   an NFC radio antenna included in the mobile phone; and
   a coupling component included in the mobile phone that:
      couples the NFC radio antenna to the NFC radio transceiver when selected to a first state, and
      decouples the NFC antenna from the NFC radio transceiver when selected to a second state in response to receiving an NFC deactivation request from a cellular wireless network, wherein the NFC deactivation request is sent in response to an indication that the mobile phone has been misplaced, and wherein the NFC antenna remains decoupled from the NFC radio transceiver in response to receiving the NFC deactivation request until an NFC radio system activation request is received from the cellular wireless network.

2. The mobile phone of claim 1, wherein the coupling component comprises a flip-flop that connects the NFC radio antenna to the NFC radio transceiver when in the first state and disconnects the NFC radio antenna from the NFC radio transceiver when in the second state.

3. The mobile phone of claim 1, wherein the coupling component comprises a radio frequency impedance matching network that is configured to match the NFC radio antenna to the NFC radio transceiver when selected to the first state and to unmatch the NFC radio antenna to the NFC radio transceiver when selected to the second state.

4. The mobile phone of claim 1, wherein the coupling component comprises a flip-flop that shorts out the NFC radio antenna when selected to the second state.

5. The mobile phone of claim 1, further comprising:
   a processor;
   a memory; and
   an application stored in the memory that, when executed by the processor,
      selects the coupling component to one of the first state or the second state based on the NFC deactivation request or the NFC activation request received by the mobile phone from the cellular wireless network.

6. The mobile phone of claim 5, wherein the application further evaluates a time-of-day criterion included in the NFC deactivation request, and wherein the application selects the coupling component to one of the first state or the second state based additionally upon the evaluation of the time of day criterion.

7. A method of operating a near field communication (NFC) radio system in a mobile phone, comprising:
receiving, by an application stored in a non-transitory memory of a mobile phone and executable by a processor of the mobile phone, a deactivate message via a cellular radio transceiver included in the mobile phone from a cellular wireless network, wherein the deactivate message requests deactivating a near field communication radio system included in the mobile phone, wherein the NFC deactivation request is sent in response to an indication that the mobile phone has been misplaced;
in response to the deactivate message, disabling, by the application, an antenna functionality of the NFC radio system included in the mobile phone until an activate message is received from the cellular wireless network;
receiving, by the application, the activate message via the cellular radio transceiver from the cellular wireless network, wherein the activate message requests enabling the NFC radio system included in the mobile phone; and
in response to the activate message, enabling, by the application, the antenna functionality of the NFC radio system included in the mobile phone.

8. The method of claim 7, wherein the antenna functionality of the NFC radio system included in the mobile phone is disabled by one of creating an open circuit in the coupling between an NFC radio antenna included in the mobile phone and an NFC radio transceiver included in the mobile phone, shorting two terminals of the NFC radio antenna, reconfiguring an impedance matching network to detune an impedance match between the NFC radio antenna and the NFC transceiver, or by inputting a noise signal into the NFC radio antenna.

9. The method of claim 7, wherein the antenna functionality is disabled for an NFC transmission operation mode of the NFC radio system but not disabled for an NFC reception operation mode of the NFC radio system in response to the deactivate message.

10. The method of claim 9, wherein the NFC reception operation mode is detected based on determining that the NFC radio system is generating a radio power signal to enable a passive NFC radio to transmit to the NFC radio system in the mobile phone.

11. The method of claim 7, wherein the deactivate message is transmitted by a customer care center of a wireless communication service provider.

12. The method of claim 7, wherein the deactivate message and the activate message are received according to one of a code division multiple access (CDMA) wireless communication protocol, a global system for mobile communications (GSM) wireless communication protocol, a long-term evolution (LTE) wireless communication protocol, or a worldwide interoperability for microwave access (WiMAX) wireless communication protocol.

13. A portable electronic device, comprising:
a cellular communication radio transceiver included in the portable electronic device;
a near field communication (NFC) radio transceiver included in the portable electronic device;
an NFC radio antenna included in the portable electronic device;
a processor included in the portable electronic device;
a memory included in the portable electronic device; and
an application stored in the memory that, when executed by the processor,
based on the cellular communication radio transceiver receiving an NFC radio disable criterion message from a cellular wireless network, selectively disables the NFC radio antenna and enables the NFC radio antenna based on a criterion provided in the NFC disable criterion message from the cellular wireless network, wherein when the NFC radio antenna is disabled, the NFC radio transceiver is not able to transmit or receive NFC messages.

14. The portable electronic device of claim 13, wherein the portable electronic device is one of a mobile phone, a personal digital assistant (PDA), and a media player.

15. The portable electronic device of claim 13, wherein the NFC radio transceiver and the NFC radio antenna are able to communicate over distances less than 20 inches.

16. The portable electronic device of claim 13, wherein the disable criterion message defines a time during which the NFC radio antenna is to be disabled.

17. The portable electronic device of claim 13, wherein the disable criterion message defines an NFC operation mode during which the NFC radio antenna is to be disabled.

18. The portable electronic device of claim 17, wherein the disable criterion message indicates that the NFC radio antenna is to be disabled during transaction NFC operation mode and enabled during other NFC operation modes.

19. The portable electronic device of claim 17, wherein the disable criterion message indicates that the NFC radio antenna is to be disabled during access NFC operation mode and enabled during other NFC operation modes.

20. The portable electronic device of claim 17, wherein the disable criterion message indicates that the NFC radio antenna is to be disabled during transaction and access NFC operation modes and enabled during other NFC operation modes.

* * * * *